US008754848B2

(12) United States Patent
Holzer et al.

(10) Patent No.: US 8,754,848 B2
(45) Date of Patent: Jun. 17, 2014

(54) PRESENTING INFORMATION TO A USER BASED ON THE CURRENT STATE OF A USER DEVICE

(75) Inventors: Michael Holzer, San Francisco, CA (US); Jeffrey Bonforte, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 369 days.

(21) Appl. No.: 13/117,020

(22) Filed: May 26, 2011

(65) Prior Publication Data
US 2011/0298701 A1    Dec. 8, 2011

Related U.S. Application Data

(60) Provisional application No. 61/349,162, filed on May 27, 2010.

(51) Int. Cl.
| | | |
|---|---|---|
| *G09G 5/00* | (2006.01) | |
| *G06T 13/00* | (2011.01) | |
| *G06F 3/033* | (2013.01) | |
| *G09G 5/08* | (2006.01) | |
| *G09G 5/02* | (2006.01) | |

(52) U.S. Cl.
USPC ........... 345/156; 345/474; 345/158; 345/165; 345/699

(58) Field of Classification Search
USPC .......................... 345/156, 474, 158, 165, 699
See application file for complete search history.

(56) References Cited

U.S. PATENT DOCUMENTS

| | | |
|---|---|---|
| 6,285,999 B1 | 9/2001 | Page |
| 6,560,620 B1 | 5/2003 | Ching |
| 6,721,748 B1 | 4/2004 | Knight et al. |
| 6,931,419 B1 | 8/2005 | Lindquist |
| 6,952,805 B1 | 10/2005 | Tafoya et al. |
| 7,076,533 B1 | 7/2006 | Knox et al. |
| 7,085,745 B2 | 8/2006 | Klug |
| 7,103,806 B1 | 9/2006 | Horvitz |
| 7,181,518 B1 | 2/2007 | Matsumoto et al. |
| 7,246,045 B1 | 7/2007 | Rappaport et al. |
| 7,444,323 B2 | 10/2008 | Martinez et al. |
| 7,512,788 B2 | 3/2009 | Choi et al. |
| 7,536,384 B2 | 5/2009 | Venkataraman et al. |
| 7,539,676 B2 | 5/2009 | Aravamudan |
| 7,627,598 B1 | 12/2009 | Burke |
| 7,707,509 B2 | 4/2010 | Naono et al. |
| 7,725,492 B2 | 5/2010 | Sittig |
| 7,743,051 B1 | 6/2010 | Kashyap et al. |
| 7,756,935 B2 | 7/2010 | Gaucas |
| 7,788,260 B2 | 8/2010 | Lunt |
| 7,805,492 B1 | 9/2010 | Thatcher |
| 7,818,396 B2 | 10/2010 | Dolin et al. |
| 7,827,208 B2 | 11/2010 | Bosworth |
| 7,836,045 B2 | 11/2010 | Schachter |
| 7,849,141 B1 | 12/2010 | Bellegarda et al. |

(Continued)

*Primary Examiner* — Aneeta Yodichkas
(74) *Attorney, Agent, or Firm* — James J. DeCarlo; Greenberg Traurig, LLP

(57) ABSTRACT

Information is presented to a user based on a current state of an end-user device (e.g., a mobile phone). In one embodiment, a method includes: detecting, via a user device, a predefined user motion of a user (e.g., a flick of a trackball or gesture on a touch screen); determining a current state of the user device based on at least one characteristic; and in response to detecting the user motion, presenting, via a display of the user device, information (e.g., a person profile) to the user based on the current state.

19 Claims, 10 Drawing Sheets

(56) References Cited

U.S. PATENT DOCUMENTS

| | | |
|---|---|---|
| 7,853,881 B1 | 12/2010 | Aly Assal et al. |
| 7,899,806 B2 | 3/2011 | Aravamudan |
| 7,908,647 B1 | 3/2011 | Polis et al. |
| 7,949,627 B2 | 5/2011 | Aravamudan |
| 7,970,832 B2 | 6/2011 | Perry et al. |
| 7,996,456 B2 | 8/2011 | Gross |
| 8,073,928 B2 | 12/2011 | Dolin et al. |
| 2001/0049628 A1 | 12/2001 | Icho |
| 2002/0024536 A1 | 2/2002 | Kahan et al. |
| 2002/0059418 A1 | 5/2002 | Bird et al. |
| 2002/0073011 A1 | 6/2002 | Brattain et al. |
| 2002/0087647 A1 | 7/2002 | Quine et al. |
| 2002/0103873 A1 | 8/2002 | Ramanathan et al. |
| 2002/0103879 A1 | 8/2002 | Mondragon |
| 2002/0107991 A1 | 8/2002 | Maguire et al. |
| 2002/0143871 A1 | 10/2002 | Meyer et al. |
| 2002/0194502 A1 | 12/2002 | Sheth et al. |
| 2003/0028525 A1 | 2/2003 | Santos et al. |
| 2003/0037116 A1 | 2/2003 | Nolan et al. |
| 2003/0120608 A1 | 6/2003 | Pereyra |
| 2003/0142125 A1 | 7/2003 | Salmimaa et al. |
| 2003/0204439 A1 | 10/2003 | Cullen |
| 2003/0233419 A1 | 12/2003 | Beringer |
| 2004/0002903 A1 | 1/2004 | Stolfo et al. |
| 2004/0034537 A1 | 2/2004 | Gengarella et al. |
| 2004/0039630 A1 | 2/2004 | Begole et al. |
| 2004/0068545 A1 | 4/2004 | Daniell et al. |
| 2004/0100497 A1 | 5/2004 | Quillen et al. |
| 2004/0128355 A1 | 7/2004 | Chao et al. |
| 2004/0128356 A1 | 7/2004 | Bernstein et al. |
| 2004/0177048 A1 | 9/2004 | Klug |
| 2004/0186851 A1 | 9/2004 | Jhingan et al. |
| 2004/0202117 A1 | 10/2004 | Wilson et al. |
| 2005/0027779 A1 | 2/2005 | Schinner |
| 2005/0055639 A1 | 3/2005 | Fogg |
| 2005/0091272 A1 | 4/2005 | Smith et al. |
| 2005/0091314 A1 | 4/2005 | Blagsvedt et al. |
| 2005/0102361 A1 | 5/2005 | Winjum et al. |
| 2005/0138070 A1 | 6/2005 | Huberman et al. |
| 2005/0164704 A1 | 7/2005 | Winsor |
| 2005/0165584 A1 | 7/2005 | Boody et al. |
| 2005/0165893 A1 | 7/2005 | Feinberg et al. |
| 2005/0198159 A1 | 9/2005 | Kirsch |
| 2005/0198299 A1 | 9/2005 | Beck et al. |
| 2005/0213511 A1 | 9/2005 | Reece et al. |
| 2005/0216300 A1 | 9/2005 | Appelman et al. |
| 2005/0222890 A1 | 10/2005 | Cheng et al. |
| 2005/0228881 A1 | 10/2005 | Reasor et al. |
| 2005/0228899 A1 | 10/2005 | Wendkos et al. |
| 2005/0235224 A1 | 10/2005 | Arend et al. |
| 2005/0278317 A1 | 12/2005 | Gross et al. |
| 2006/0004892 A1 | 1/2006 | Lunt |
| 2006/0004914 A1 | 1/2006 | Kelly et al. |
| 2006/0031340 A1 | 2/2006 | Mathew et al. |
| 2006/0047747 A1 | 3/2006 | Erickson et al. |
| 2006/0053199 A1 | 3/2006 | Pricken et al. |
| 2006/0059151 A1 | 3/2006 | Martinez et al. |
| 2006/0064434 A1 | 3/2006 | Gilbert et al. |
| 2006/0065733 A1 | 3/2006 | Lee et al. |
| 2006/0075046 A1 | 4/2006 | Yozell-Epstein et al. |
| 2006/0085752 A1 | 4/2006 | Beadle et al. |
| 2006/0101350 A1 | 5/2006 | Scott |
| 2006/0179415 A1 | 8/2006 | Cadiz et al. |
| 2006/0217116 A1 | 9/2006 | Cassett et al. |
| 2006/0224675 A1 | 10/2006 | Fox et al. |
| 2006/0242536 A1 | 10/2006 | Gogerty |
| 2006/0248151 A1 | 11/2006 | Belakovskiy et al. |
| 2006/0256008 A1 | 11/2006 | Rosenberg |
| 2006/0281447 A1 | 12/2006 | Lewis et al. |
| 2006/0282303 A1 | 12/2006 | Hale et al. |
| 2007/0005702 A1 | 1/2007 | Tokuda et al. |
| 2007/0005715 A1 | 1/2007 | LeVasseur et al. |
| 2007/0005750 A1 | 1/2007 | Lunt et al. |
| 2007/0022447 A1 | 1/2007 | Arseneau et al. |
| 2007/0060328 A1 | 3/2007 | Zeike et al. |
| 2007/0071187 A1 | 3/2007 | Apreutesei et al. |
| 2007/0083651 A1 | 4/2007 | Ishida |
| 2007/0088687 A1 | 4/2007 | Bromm et al. |
| 2007/0115991 A1 | 5/2007 | Ramani et al. |
| 2007/0123222 A1 | 5/2007 | Cox et al. |
| 2007/0129977 A1 | 6/2007 | Forney |
| 2007/0143414 A1 | 6/2007 | Daigle |
| 2007/0177717 A1 | 8/2007 | Owens et al. |
| 2007/0185844 A1 | 8/2007 | Schachter |
| 2007/0214141 A1 | 9/2007 | Sittig |
| 2007/0218900 A1 | 9/2007 | Abhyanker |
| 2007/0255794 A1 | 11/2007 | Coutts |
| 2007/0271527 A1 | 11/2007 | Paas et al. |
| 2007/0288578 A1 | 12/2007 | Pantalone |
| 2008/0005247 A9 | 1/2008 | Khoo |
| 2008/0005249 A1 | 1/2008 | Hart |
| 2008/0037721 A1 | 2/2008 | Yao et al. |
| 2008/0040370 A1 | 2/2008 | Bosworth |
| 2008/0040474 A1 | 2/2008 | Zuckerberg |
| 2008/0040475 A1 | 2/2008 | Bosworth |
| 2008/0055263 A1 * | 3/2008 | Lemay et al. ................. 345/173 |
| 2008/0056269 A1 | 3/2008 | Madhani et al. |
| 2008/0065701 A1 | 3/2008 | Lindstrom et al. |
| 2008/0071872 A1 | 3/2008 | Gross |
| 2008/0077614 A1 | 3/2008 | Roy |
| 2008/0104052 A1 | 5/2008 | Ryan et al. |
| 2008/0113674 A1 | 5/2008 | Baig |
| 2008/0120411 A1 | 5/2008 | Eberle |
| 2008/0122796 A1 | 5/2008 | Jobs et al. |
| 2008/0162347 A1 | 7/2008 | Wagner |
| 2008/0162649 A1 | 7/2008 | Lee et al. |
| 2008/0162651 A1 | 7/2008 | Madnani |
| 2008/0163164 A1 | 7/2008 | Chowdhary et al. |
| 2008/0170158 A1 | 7/2008 | Jung et al. |
| 2008/0172464 A1 | 7/2008 | Thattai et al. |
| 2008/0220752 A1 | 9/2008 | Forstall et al. |
| 2008/0222279 A1 | 9/2008 | Cioffi et al. |
| 2008/0235353 A1 | 9/2008 | Cheever et al. |
| 2008/0293403 A1 | 11/2008 | Quon et al. |
| 2008/0301166 A1 | 12/2008 | Sugiyama et al. |
| 2008/0301245 A1 | 12/2008 | Estrada et al. |
| 2009/0010353 A1 | 1/2009 | She et al. |
| 2009/0029674 A1 | 1/2009 | Brezina et al. |
| 2009/0030872 A1 | 1/2009 | Brezina et al. |
| 2009/0030919 A1 | 1/2009 | Brezina et al. |
| 2009/0030933 A1 | 1/2009 | Brezina et al. |
| 2009/0030940 A1 | 1/2009 | Brezina et al. |
| 2009/0031232 A1 | 1/2009 | Brezina et al. |
| 2009/0031244 A1 | 1/2009 | Brezina et al. |
| 2009/0031245 A1 | 1/2009 | Brezina et al. |
| 2009/0070412 A1 | 3/2009 | D'Angelo |
| 2009/0106415 A1 | 4/2009 | Brezina et al. |
| 2009/0106676 A1 | 4/2009 | Brezina et al. |
| 2009/0119678 A1 | 5/2009 | Shih et al. |
| 2009/0174680 A1 * | 7/2009 | Anzures et al. ................. 345/173 |
| 2009/0177754 A1 | 7/2009 | Brezina et al. |
| 2009/0182788 A1 | 7/2009 | Chung et al. |
| 2009/0198688 A1 | 8/2009 | Venkataraman et al. |
| 2009/0213088 A1 * | 8/2009 | Hardy et al. ................. 345/173 |
| 2009/0228555 A1 | 9/2009 | Joviak et al. |
| 2010/0030715 A1 | 2/2010 | Eustice et al. |
| 2010/0049534 A1 | 2/2010 | Whitnah |
| 2010/0153832 A1 | 6/2010 | Markus et al. |
| 2010/0164957 A1 | 7/2010 | Lindsay |
| 2010/0169327 A1 | 7/2010 | Lindsay |
| 2010/0174784 A1 | 7/2010 | Levey et al. |
| 2010/0185610 A1 | 7/2010 | Lunt |
| 2010/0229223 A1 | 9/2010 | Shepard |
| 2010/0235375 A1 | 9/2010 | Sidhu et al. |
| 2010/0281535 A1 | 11/2010 | Perry et al. |
| 2010/0306185 A1 | 12/2010 | Smith et al. |
| 2011/0282905 A1 | 11/2011 | Polis et al. |
| 2011/0291933 A1 | 12/2011 | Holzer |
| 2012/0017158 A1 | 1/2012 | Maguire et al. |

* cited by examiner

FIG. 3
FIG. 4
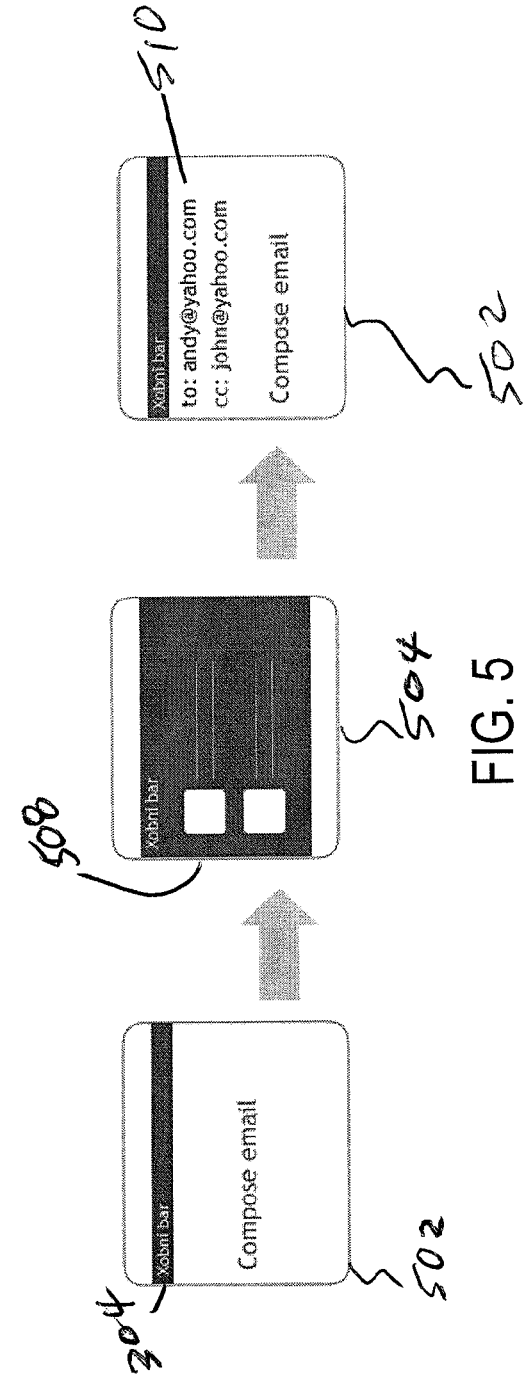
FIG. 5

PRESENTING INFORMATION TO A USER BASED ON THE CURRENT STATE OF A USER DEVICE

CROSS-REFERENCE TO RELATED APPLICATIONS

The present application claims priority to U.S. Provisional Application Ser. No. 61/349,162, filed May 27, 2010, entitled "PRESENTING A NEW USER SCREEN IN RESPONSE TO DETECTION OF A USER MOTION," by Michael Holzer et al., the entire contents of which application are incorporated by reference as if fully set forth herein.

FIELD OF THE TECHNOLOGY

At least some embodiments disclosed herein relate to user interfaces in general, and more particularly, but not limited to, presenting information to a user of an end-user device based on a current state of the end-user device.

BACKGROUND

Electronic communications between persons for both business and personal use are now extensively used. In addition to e-mail communications and telephone communications, additional forms of communication are common, including instant messaging, social network messaging and commenting, message board posting, and text messaging.

Conventional computing systems and devices are configured to support applications such as e-mail or instant messaging that implement an address book. The address book may be accessed by a user of the application (or by the application itself) for a variety of purposes. Typically, the address book is unique for a given application and may contain unique application specific data.

In conventional applications, each address book entry must be manually entered and maintained by a user. Over time, some entries become outdated due to a lack of regular maintenance, while other entries become obsolete. As the number of contacts grow, the maintenance of the address book may become difficult and time consuming.

Further, access to the address book during regular usage of a personal communication device typically requires that the user manually navigate to an address book screen of the device using a combination of buttons, keys (e.g., keys located on the face of a phone or other user device), and other cursor navigational devices, and/or the clicking on one or more icons or highlighted regions located on a screen of a user interface of the device. In addition, the foregoing navigation results in the user being presented a different screen in order to access the information in the address book. Finally, the user must typically manually type a few letters corresponding to a person's name in order to search for and obtain that person's information from among all of the typically numerous records stored in the address book.

SUMMARY OF THE DESCRIPTION

Systems and methods to present information to a user of an end-user device based on a current state (e.g., user context, mobile device status, and current and/or historical user actions or user motions such as by using keys on a keyboard or by gestures on a touch screen) of the end-user device. Some embodiments are summarized in this section.

In one embodiment, a method includes: detecting, via a user device (e.g., a mobile phone), a predefined user motion of a user (e.g., a flick of a trackball or gesture on a touch screen); determining a current state of the user device based on at least one characteristic; and in response to detecting the user motion, presenting, via a display of the user device, information (e.g., a person profile) to the user based on the current state.

In another embodiment, a method includes: running an application (e.g., an email application or a voice communications application), on a user device, requested by a user via a user interface of the user device; receiving a request for information from the user associated with use of the application by the user; determining a current state of the user device based on at least one characteristic of the user device; and in response to the request, presenting, via a display of the user device, information to the user based on the current state.

In an alternative embodiment, a method includes: presenting, via a display of an end-user device, a first user interface screen; detecting, via a user input device of the end-user device, a predefined user motion associated with the first screen, wherein the user motion is substantially in a single direction of movement in a plane parallel to the display; and in response to detecting the user motion, presenting a second user interface screen via the display, the second screen including information corresponding to the first screen.

In another alternative embodiment, a method includes: presenting, via a display of an end-user device, a first user interface screen including an input field to identify a person; detecting, via a user input device of the end-user device, a predefined user motion associated with the first screen; in response to detecting the user motion, presenting a second user interface screen via the display, the second screen including a list of persons and further including a search input field configured to initiate a search of stored personal data available for use as a data input for the first screen; and updating the list of persons of the second screen in response to the searching of the stored personal data.

In yet another alternative embodiment, a method includes: presenting, via a display of a mobile device, a first user interface screen including an input field to identify a person; detecting, via a trackball of the mobile device, a predefined user motion associated with the first screen, wherein the user motion is an upward movement on the trackball by a user of the mobile device; in response to detecting the user motion, presenting a second user interface screen via the display, the second screen including a list of persons and corresponding personal data, the personal data being available as input data for the first screen upon selection of a person by the user; receiving a selection by the user of a first person from the list of persons of the second screen; and displaying personal data corresponding to the first person on the first screen.

The disclosure includes methods and apparatuses which perform these methods, including data processing systems and user devices which perform these methods, and computer readable media containing instructions which when executed on data processing systems and user devices cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

FIG. 3 shows an email composition screen of an end-user device according to one embodiment.

FIG. 4 shows an email message list screen of an end-user device according to one embodiment.

FIG. 5 shows the opening and display of a second screen of an end-user device that lists a plurality of persons or contacts, the second screen being presented in response to detection of a user motion by the end-user device on an email composition screen according to one embodiment.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
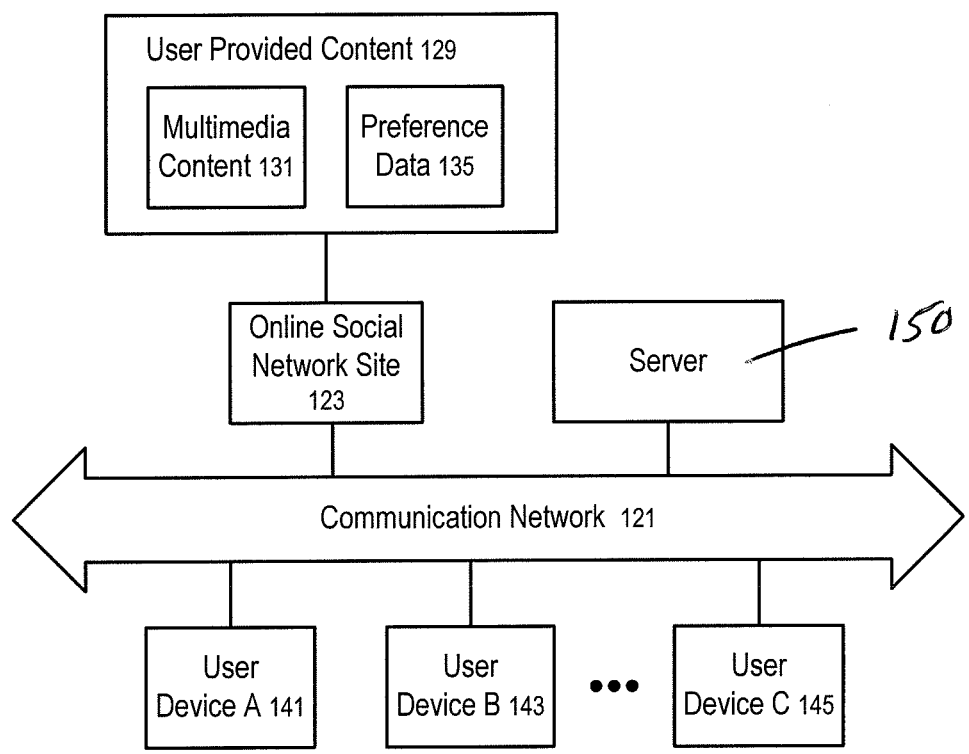
FIG. 1 shows a system for electronic communication amongst a server, a plurality of user devices, and a social network site according to one embodiment.

FIG. 1 shows a system for electronic communication amongst a server 150, a plurality of user devices (e.g., 141, 143, ..., 145), and an online social network site 123 according to one embodiment. In FIG. 1, the user devices (e.g., 141, 143, ..., 145) may be used to access server 150 and/or social network site 123 over a communication network 121 (e.g., the Internet, a wide area network, a local area network, and/or a cellular network). Server 150 may communicate with one or more of the user devices in order to provide and periodically update address book, personal profile, and/or other contact or personal information stored on each user device. This personal information may be accessed by a user on the user device when, for example, executing an application (e.g., a calendar application) on the user device. Also, each user device may provide new or updated data regarding personal information (e.g., data from an address book stored on the user device) to server 150. The server 150 and/or the online social network site 123 may include one or more web servers (or other types of data communication servers) to communicate with the user devices (e.g., 141, 143, ..., 145) or with one another.

In addition, server 150 may communicate with social network site 123 over network 121. Server 150 may, for example, update the address book or personal profile or other personal information stored at server 150 by accessing and retrieving updated data from social network site 123, then updating the personal information using the updated data. The updated personal information may be communicated to the user devices (e.g., 141, 143, ..., 145).

The address book may be implemented in volatile memory (e.g., RAM) or non-volatile memory (e.g., flash memory) of a computing system (e.g., a personal PC) or a wireless device (e.g., iPhone®, BlackBerry®, Treo®, etc.), in an element external to the computing system or wireless device through a network (e.g., a server or host PC), or a combination of some or all of these elements. The address book may be used in conjunction with other software applications such as, without limitation, an information manager, a personal organizer, a personal calendar, a personal wiki, or any other source of contact information.

In one embodiment, the address book may be included as part of an e-mail client executing on the user device. Alternatively, the address book may be a stand-alone application that is either client or web-based. When used as a stand-alone application, the address book may include one or more application program interfaces for allowing for information retrieval and access by other applications.

In some implementations, the address book may be developed as a stand-alone application for managing one or more contacts associated with a user of the user device (e.g., owner of the address book). The address book may import contacts from (or export to) other applications, systems or devices (e.g., Microsoft Outlook® applications, BlackBerry® devices, iPhone devices, etc.) forming a record (e.g., person profile including several data items) for each. Where the address book is developed as a stand-alone application, the user associated with the address book also may access the address book from, for example, the owner's e-mail clients, social networks, mobile phones, instant messaging networks and the like.

Contact information associated with existing contacts stored on a user device also may be collected or updated from outside sources (e.g., using a search engine that is part of or accessible by routines associated with the address book) over communication network 121. The information may be collected by processes running on a user device or may be supported by processes running on server 150.

The outside sources may include information gathered from company web sites, personal web sites, social network web pages (e.g., available on social network site 123) or other information sources (e.g., person search directory pages, photo or video sharing websites, travel websites, online retailers, and maps and directions websites). As an example, the address book may update or expand its profiles (e.g., including updating or populating entry fields associated with the existing contacts) by crawling through web pages to gather additional information to be included in a profile. For example, the address book may utilize conventional web crawlers to crawl through web sites such as, without limitation, social networking web sites such as Facebook®, Myspace®, LinkedIn®, Twitter®, Xanga®, Friendster®, YouTube® and Orkut®, gaming sites, gaming networks, photo services, and content sharing sites such as music and video sharing sites, people search engines, telephone directories, scanned business card data, and the like. Other types of online networks, communities or personal web pages may be searched including, for example, job hunting websites (e.g., monster.com), school alumni websites, organizations of professionals, Internet dating sites, ratings sites (e.g., epinions.com, Yelp.com), closed or proprietary networks, instant message networks, and company internal websites (e.g., Intranet). Web pages may be crawled on a scheduled basis or in response to a user input, and the retrieved information may be sorted and stored in the address book on the user device.

The address book may be presented as a user interface (e.g., facilitated by a presentation process on the user device that displays information in one or more user interface screens on a display of the user device) that includes one or more entries with each entry containing contact information associated with a contact such as name, e-mail address (e.g., business and personal), phone number, job title, message histories with the contact, e-mail history associated with the contact, usage history (e.g., date and time) indicating prior calls from the contact, information indicating past, present and future events involving the contact (e.g., meetings with the contact), SMS/MMS messages with the contact, contacts who are part of the contact's network, and social network profile URLs. Other information such as screen names (e.g., instant messenger screen names), personal web site URLs, physical address and the like also may be included.

As discussed below in more detail, each user device has a display to present a first user interface screen (e.g., an email composition screen) to a user. An operating system, application, or process executing on the user device detects, via a user input device (e.g., a trackball on a BlackBerry device or phone) of the user device, a predefined user motion associated with the first screen. In one embodiment, the user motion is performed substantially in a single direction of movement in a plane parallel to the display (e.g., a rolling of a trackball in an upwards direction). In other embodiments, the user motion may be performed as a motion made substantially in a plane parallel to the display (e.g., a movement of a trackball in any direction). In yet other embodiments, the movement may be any type of detectable user motion on a trackball, key, button, or other input device and/or on a touch screen.

In response to detecting this user motion, the user device presents a second user interface screen to the user on the display. The second screen includes information corresponding to the first screen. In one embodiment, the information is a list of persons and includes data items corresponding to each person. The data items may be, for example, email addresses, phone numbers, or other data associated with a particular person. The email addresses may be selected one by one by the user, for example, by scrolling down the list and clicking on an address for a particular person. After clicking in this manner, the address is added as an input data item to a "To:" field on the first email composition screen. The address is displayed to the user on this screen. The user may perform the predefined user motion a second and further additional times as desired to add additional addresses to the email being composed.

In other embodiments, the first screen may be configured for a purpose other than email creation (e.g., calendar appointment or task creation). In such other embodiments, the second screen would present data items for persons that is relevant to the context of the first screen (i.e., the data items made available for selection by the user on the second screen would be contextually selected and be relevant to completion of input fields or other input data required or desirable or optionally entered on the first user interface screen).

The online social network site 123 may be connected to a data storage facility to store user provided content 129, such as multimedia content 131, preference data 135, etc., provided from the user devices (it is not necessary that all user devices communicate with server 150). The multimedia content 131 may include, for example, photos of a user of the user device or of another identified person. The user may upload address or other personal information regarding the user and/or other persons to social network site 123 as user provided content 129, and such information may subsequently be communicated to server 150 as described herein, and then ultimately be communicated to an address book or another form of information stored on a user device and accessible to a user on a second screen as discussed herein.

In FIG. 1, the users may use the devices (e.g., 141, 143, . . . , 145) to make implicit or explicit recommendations or provide other information that may also be stored as user provided content 129. Such other information may include, for example, a still picture or a video clip taken at a recommended location, a text message or a sound clip to describe a location, etc. This other information may be included in information obtained by a process executing on server 150 that searches for and collects relevant information to use in creating or updating an address book or other list of personal information stored on a user device. Alternatively, a process on a user device may directly search for and collect such information to update an address book or other personal information stored on the user device.

In one embodiment, the personal information may be a person profile including contact information. The contact information displayed to a user of the user device may include e-mail addresses, telephone numbers, screen names, social network profile names, social network profile URLs, physical addresses, facsimile numbers, or website URLs. The contact information may be collected from a variety of sources including communications between the person and the user, communications between the user and other persons, e-mail body text, e-mail meta data, e-mail header information, e-mail attachments, web search engines, people search engines, social networks, e-mail clients, instant messages, personal web pages, telephone directories, scanned business card data, text messages, picture sharing websites, video sharing websites, person profile pages, telephone communications, or customer relationship management systems. For example, when the user receives an e-mail from a person, that person's e-mail address may be added to the list of contact information for that person's profile (e.g., as a person profile stored in the address book on the user device). In another example, when the user makes a phone call to a person, that person's telephone number may be added to the list of contact information for that person's profile.

In one embodiment, the user device is a phone (e.g., voice over IP phone) used by the user. For example, the phone may include a system or process for detecting when the user makes or receives a phone call or text message using the phone and display information related to a recipient or initiator of the phone call or text message in a person profile. For example, this information may be displayed in response to detection of a predefined user motion (or even a series of motions).

In one embodiment, the user device (e.g., 141, 143, . . . , 145) can also be used to submit multimedia content (e.g., 131) tagged with one or more attributes (e.g., GPS location associated with a photo). For example, in one embodiment, the user device includes a digital still picture camera, or a digital video camera. The user device can be used to create multimedia content or other files for sharing with friends in the online social network. Some or all of this information may be made available to the general public such that server 150 (or other user devices) may access it without specific permission from the user that originally provided the information to social network site 123, and then update stored personal information based on this access. In an alternative embodiment, the multimedia content can be created using a separate device and loaded into the online social network using the user device (e.g., 141, 143, . . . , 145).

In another embodiment, the user devices communicate with one another over communication network 121. The user devices may be desktop computers, laptop computers, cell phones, web enabled televisions, or personal digital assistants. The communication transmitted from one user device to another user device may be an e-mail, phone call, instant message, text message, social network message or comment, message board post, or voice over IP communication.

A second user device may extract data from a communication it receives from a first user device about the first user. This data may be used to make a person profile. Data extracted from other communications with the first user may also be used to create a person profile for the first user. Data that is extracted from communications with the first user may be used to query websites, search engines, person search directories and other sources of information for additional information about the first user that may be used to create a person profile. Information from communications that may be used as search criteria include names, screen names, social network profile names, social network profile URLs, physical addresses, website URLs, e-mail addresses, or telephone numbers. Information that is collected as a result of these queries may be used in future searches to identify additional information that may be used to create a person profile.

The second user device may receive an e-mail sent by the first user from the first user device. The second user device may perform a search using a search engine with the first user's e-mail address as the search criteria. The search engine may return a search result that includes the first user's phone number. This phone number may be displayed as part of a person profile for the first user. The search engine may also return the URL for or link to a personal website belonging to the first user. The personal website may contain additional information about the first user that may be used to create a person profile, such as additional contact information or biographical information.

Although FIG. 1 illustrates an example system implemented in client server architecture, embodiments of the disclosure can be implemented in various alternative architectures. For example, the server 150 or online social network 123 can be implemented via a peer to peer network of user devices, where information is shared via peer to peer communication connections. Also, portions of the processing described herein may be implemented in the individual user devices, instead of running on one or more centralized servers. In some embodiments, a combination of client server architecture and peer to peer architecture can be used, in which one or more centralized server may be used to provide some of the information and/or services and the peer to peer network is used to provide other information and/or services. Thus, embodiments of the disclosure are not limited to a particular architecture.

Various examples of systems and methods that may be used with the systems and methods of the present disclosure, including exemplary end-user devices, address books, methods for handling and collecting contact and other information, and methods for the presentation of such information to a user of a device, is described in pending U.S. provisional application Ser. No. 61/183,315, filed Jun. 2, 2009 (titled "Self Populating Address Book" by Smith et al.), which is hereby incorporated by reference herein for all of its teachings.

In one embodiment, a process collects and presents historical communication and personal data to a user in one or more screens of the user device. The process may, for example, be implemented in an e-mail application of the user device. In another example, the process may be implemented on server 150, and the updated or new data communicated to the user device for display.

In this process, historical communication data and personal data are collected. For example, communications such as e-mails, instant messages, phone calls, text messages, internet message board postings, social network messages or comments, or voice over IP communications may be collected. Historical communication data and personal data may also be collected from web search engines, people search engines, social networks, e-mail clients, personal web pages, telephone directories, scanned business card data, picture sharing websites, video sharing websites, person profile pages, travel websites, on-line retailers, or customer relationship management systems.

The collected historical communication data and personal data may include contact information, biographical information, communication text, communication summaries, physical location information, mapping information, attachments to communications, weather information, travel information, and retail information.

The collected data is deposited into a repository (e.g., stored as records in an address book on a user device). For example, the collected data may be stored in a database on a user's laptop computer. The collected data may also be stored on a network server, a web server, a removable storage device, or as part of an e-mail client, other communication client or stand-alone application (e.g., an address book application).

In some embodiments, the user's behavior may be monitored. For example, the user device may track the mouse movements, keyboard strokes, or mouse clicks of a user, or active windows or mouse locations displayed on a monitor or other display device of the system. The user's behavior may be monitored to determine if a user has opened, viewed, read, or composed a communication, such as an e-mail. The user's behavior may also be monitored to determine if the user has performed a search, clicked on a particular item, or selected a particular item.

In one embodiment, data from the repository may be presented in response to user behavior. For example, a person profile may be displayed in response to a user selecting an e-mail in an inbox viewing panel or screen. In another example, information about a person may be displayed in response to a user performing a search for the person's name from a different screen. In another example, information about a file may be displayed in response to a user clicking on the file in an e-mail or other communication. In another example, information about a topic may be displayed in response to a user clicking on or selecting text within the body of a communication. Thus, the type of information presented to the user may be dependent upon the context of a combination of the current user interface screen, and the historical user interface actions of the user.

Figure 2:
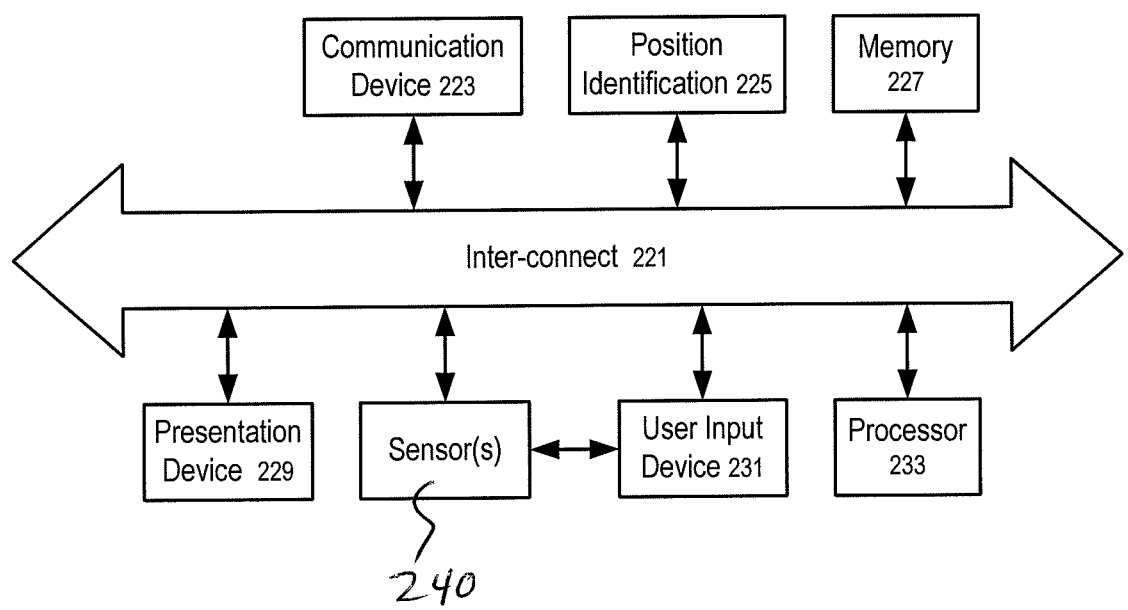
FIG. 2 shows a block diagram of an end-user device according to one embodiment.

FIG. 2 shows a block diagram of an end-user device according to one embodiment. In FIG. 2, the end-user device includes an inter-connect 221 connecting the presentation device 229, user input device 231, a processor 233, a memory 227, a position identification unit 225 and a communication device 223.

In FIG. 2, the position identification unit 225 is used to identify a geographic location for user content created for uploading to social network site 123. The position identification unit 225 may include a satellite positioning system receiver, such as a Global Positioning System (GPS) receiver, to automatically identify the current position of the user device. In FIG. 2, the communication device 223 is configured to communicate with online social network 123 to provide user data content tagged with navigation data or other attributes. The communication device 223 is also configured to communicate with server 150.

In one embodiment, the user input device 231 is configured to generate user data content which is to be tagged with attributes for sharing. The user input device 231 may include a text input device, a still image camera, a video camera, and/or a sound recorder, etc.

In one embodiment, the user input device 231 and the position identification unit 225 are configured to automatically tag the user data content created by the user input device 231 with navigation information identified by the position identification unit 225 or with other data generated by the user device.

In one embodiment, one or more sensors 240 are coupled to sense motion by user input device 231. Predefined user motions are stored in memory 227, and processor 233 executes a process to detect data from sensors 240 and to process and compare the data with the stored user motions to detect whether a user has performed a predefined motion. Sensors 240 may be integral with the user input device, or may be an additional component coupled to sense the operation of the input device. In one embodiment, sensors 240 detect a direction and/or a velocity or an acceleration of a user motion (e.g., on a trackball) to determine if a predefined user motion is being performed. The detection may include determining if the velocity or acceleration equals or exceeds a predetermined threshold level. The detection may also include a determination of whether the user is continuing the roll the trackball in successive movements closely spaced in time (e.g., less than 1 second apart), which would indicate that the user is intending to navigate rather than launch a second user interface screen.

In one embodiment, the predefined user motion is a flick of the user via a trackball. The flick may be defined to be a short, quick movement of the trackball in a given direction (e.g., an upwards flick). The detection may include determining the velocity or acceleration of the flick. In another embodiment, the presentation of the second user interface screen is conditioned on the context of the user's experience (historical and/or present as described herein). In other words, the presentation of a second screen and the data included therein may be a contextual response (e.g., based on a state awareness of the context of the user's experience as determined from present and historical data). This context may include the user interface path by which the user has arrived at the currently-viewed screen or other user interface.

FIG. 3 shows an email composition screen 300 of an end-user device (e.g., 141, 143, . . . , 145) according to one embodiment. The end-user device is, for example, a BlackBerry phone or other wireless communications device having a trackball input device for a user to navigate screens of a user interface presented on a display of the device. A predefined user motion of a flick upwards is detected when the user's cursor 302 (i.e., a position indicator on the display or screen) is in an area, region or a field located at the top of screen 300, or alternatively, when the user's cursor 302 located immediately underneath a status indicator 304 (e.g., a bar having text such as "Xobni bar" in FIG. 3).

The presence of the status indicator 304 indicates to the user that a process executing on the user device is presently able to detect the user motion (e.g., here as a flick upwards). The upward movement via the trackball (or another input device) corresponds to the user's indication of a desire to select or activate the second user interface screen. The status indicator 304 indicates to the user the service provider, software proprietor, or other nature of the data or service process or software that will be providing contextually relevant information in a second user screen. In some embodiments, the lack of any status indicator 304 (e.g., on other screens) may be used to indicate to the user that a flick will not activate a second screen from the current first screen.

In this embodiment, the user motion is substantially in a single upwards direction. Some allowance may be made for user inaccuracy in moving the trackball such that a combination of motion upwards and partially leftwards or rightwards (e.g., less than 45 degrees left or right) is still detected as a predefined upwards user motion that launches the display of the second screen.

FIG. 4 shows an email message list screen 400 of an end-user device according to one embodiment. A plurality of emails 402 (the detail for individual emails not shown) are displayed. A highlighted field 404 is positioned by a user on a specific email of interest. The user can perform an upwards flick when positioned on this specific email and in response a second screen will be presented (e.g., as a drop down screen extending downwards from the indicator bar 304) to display contextually relevant information for the item currently selected. The presence of indicator bar 304 may be used to indicate to the user that the drop down second screen is active for yet additional detections of user motions and presentation of contextually relevant information (e.g., that a flick will be detected and further action taken in response to its detection).

Determining the presence of a flick motion may be based on acceleration. A determination is made, for example, if the trackball movement in the upward direction is significantly faster than a normal upward navigation based on movement (e.g., typical movement for users in general, or historical, stored data on movement for that particular user). The speed of the movement is compared to a normal movement. If the speed or velocity of the movement is, for example, twice that of a normal speed, then the motion is interpreted as a predefined flick user motion.

FIG. 5 shows the opening and display of a second screen 504 of an end-user device that lists a plurality of persons or contacts, the second screen being presented in response to detection of a user motion (e.g., an upwards flick motion) by the end-user device on an email composition screen 502 according to one embodiment. Indicator bar 304 is displayed in email composition screen 502. The user flicks upward as described above, then in response second user interface screen 504 is presented. Typically, the information presented in the second screen 504 is of relevance to input data that a user will be providing to the first screen (e.g., selecting recipients for a new email being composed).

A list of persons 508 (e.g., contacts from the address book of the user device) are displayed in screen 504. The persons listed may be selected from the address book based on their relevance and ranking of importance, or based on other factors known by the user device (e.g., historical actions by user, or context of the current user interface environment). In one embodiment, the persons are listed using ranking based on a combination of factors including the following: the number of email messages sent to and from a particular person, the timing that emails have been sent including an emphasis on emails sent more recently (e.g., it may be inferred that a meeting or appointment being created is more likely to be created for inviting a person associated with a more recent email).

The user selects one of the persons. The selected person is used by the user device as, for example, a recipient 510 of an email being composed. The second screen may close automatically after selection of a person, or may be closed by the user (such as by pressing the "back" button on a BlackBerry device). Also, an icon or button may be provided in second screen 504 that the user can select or click on to return to the first screen 502.

The email composition screen 502 now displays the email address of the selected person (i.e., the selected contact has been added to the appropriate address field such as "to:" or "cc:"). The user may use a flick motion to again launch the opening of second screen 504 for the selection of additional persons.

Figure 6:
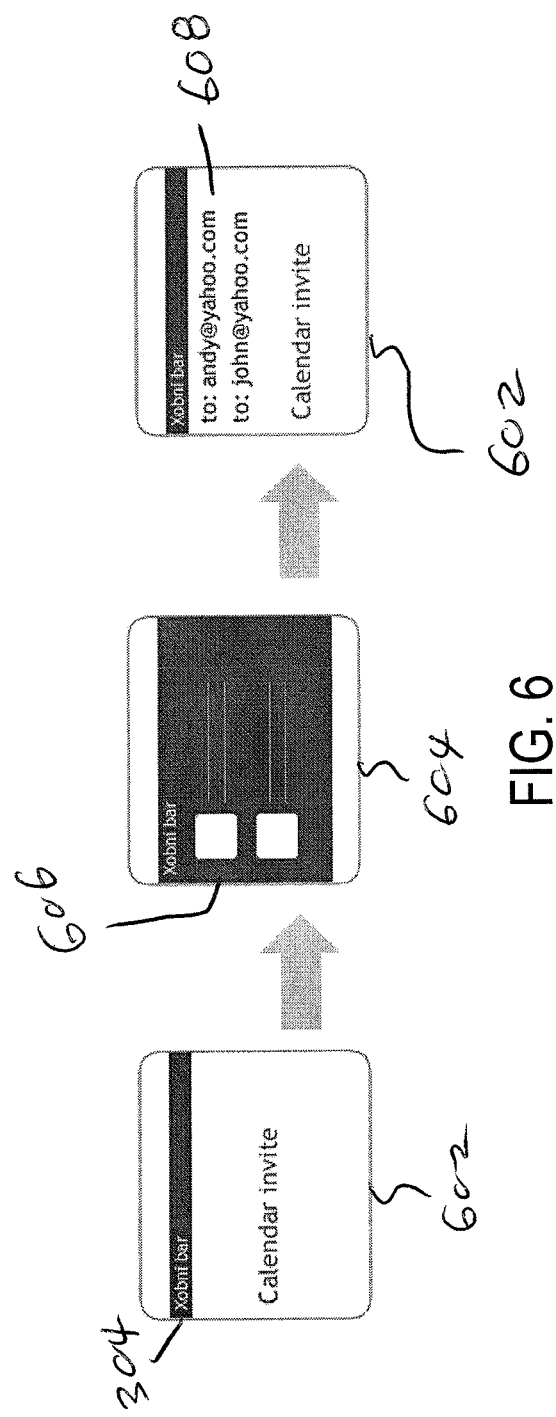
FIG. 6 shows the opening and display of a second screen of an end-user device that lists a plurality of persons or contacts, the second screen being presented in response to a user motion on a calendar event creation screen according to one embodiment.

FIG. 6 shows the opening and display of a second screen 604 of an end-user device that lists a plurality of persons or contacts, the second screen 604 being presented in response to a user motion detected from a user when viewing a calendar event creation screen 602 according to one embodiment. The user may use a flick motion when in first screen 602. The flick motion may be performed when a cursor is at a particular position or location of screen 602, and the presentation of second screen 604 may be conditioned on the cursor being at this position or location when the motion is detected or initiated. Second screen 604 displays a list of contacts 606 similarly as discussed above for FIG. 5. The user selects one or more of the contacts 606, and corresponding email addresses 608 are added to input fields in screen 602. After the user navigates away from second screen 604, contacts 606 are displayed on screen 602 in the appropriate fields.

Figure 7:
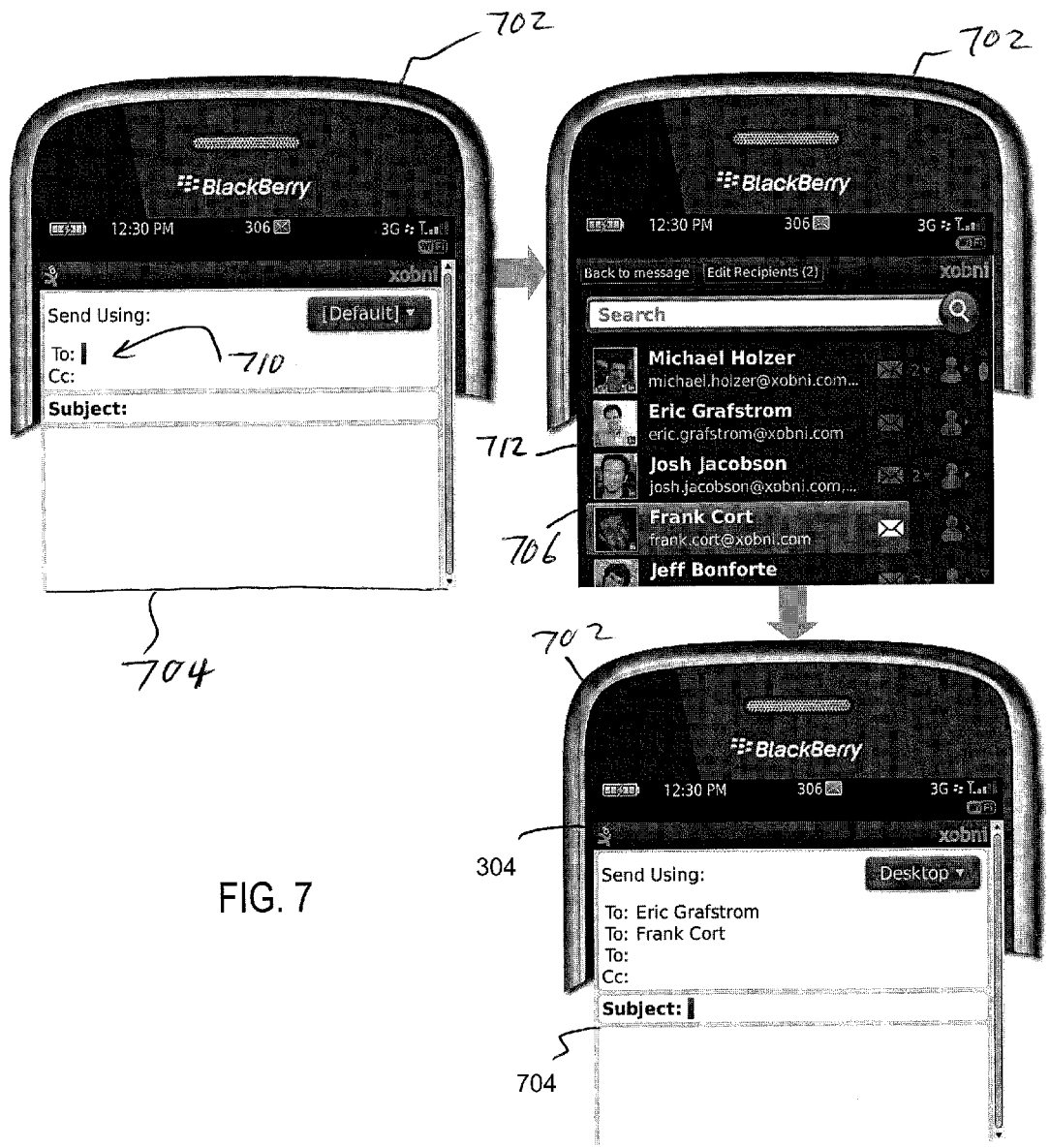
FIG. 7 shows the presentation of a contact list or address book listing of persons in response to detection by an end-user device of an upwards flicking user motion on a trackball when viewing an email composition screen according to one embodiment.

FIG. 7 shows the presentation of a contact list or address book listing of persons in a drop down screen or menu 712 in response to detection by an end-user BlackBerry phone device 702 of an upwards flicking user motion on a trackball when viewing an email composition screen 704 according to one embodiment. The user flicks upward on the trackball when the cursor 710 is in the "To:" field. The contacts presented in second screen 712 are contextually relevant to the task being performed by the user (i.e., the selection of a person to be a recipient). After selecting a contact 706, the user clicks back to the message being composed on screen 704. The user may view the contacts that have been added as input data in the appropriate input fields of screen 704.

Figure 8:
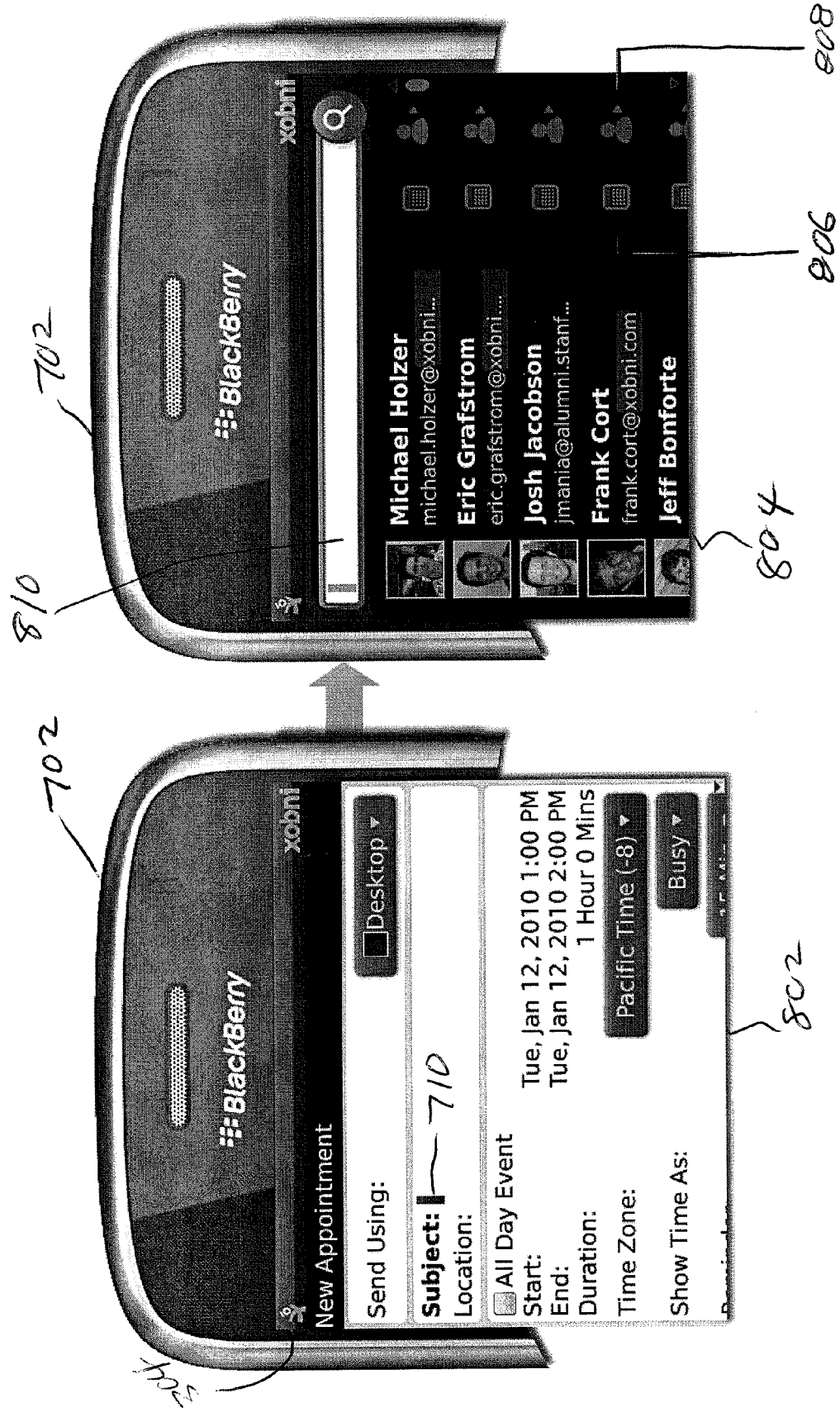
FIG. 8 shows the presentation of a new screen having a list of persons and related information for each person, the new screen being presented in response to detection of a user motion when in a new appointment creation screen according to one embodiment.

FIG. 8 shows the presentation of a new screen 804 having a list of persons and related information for each listed person, the new screen being presented in response to detection of a user motion when the user is in a new appointment creation screen 802 according to one embodiment. It should be noted that a second user interface screen as described herein may be presented as a window or smaller screen that is merely a portion of a larger screen. It is not necessary that the second screen completely replace the contents of the original first screen from which a user motion is detected. In other words, portions of the first screen may still remain visible on the display even after the second screen is launched.

If the user uses an upwards flick motion on screen 802 when cursor 710 is positioned in a subject field, then second screen 804 is presented providing a list of persons for selection to the new appointment. The second screen 804 may include a search field 810. The user may enter letters or other information that may be used to search for other persons to be listed in screen 804 for selection. The search may be performed, for example, on a database stored on the user device or on server 150. The list of persons in second screen 804 is updated based on the results of the search.

An icon 806 for each contact may be provided for the user to click to add the contact to the appointment or calendar invitation. An icon 808 may be clicked by the user to view a full person profile for that particular person.

Figure 9:
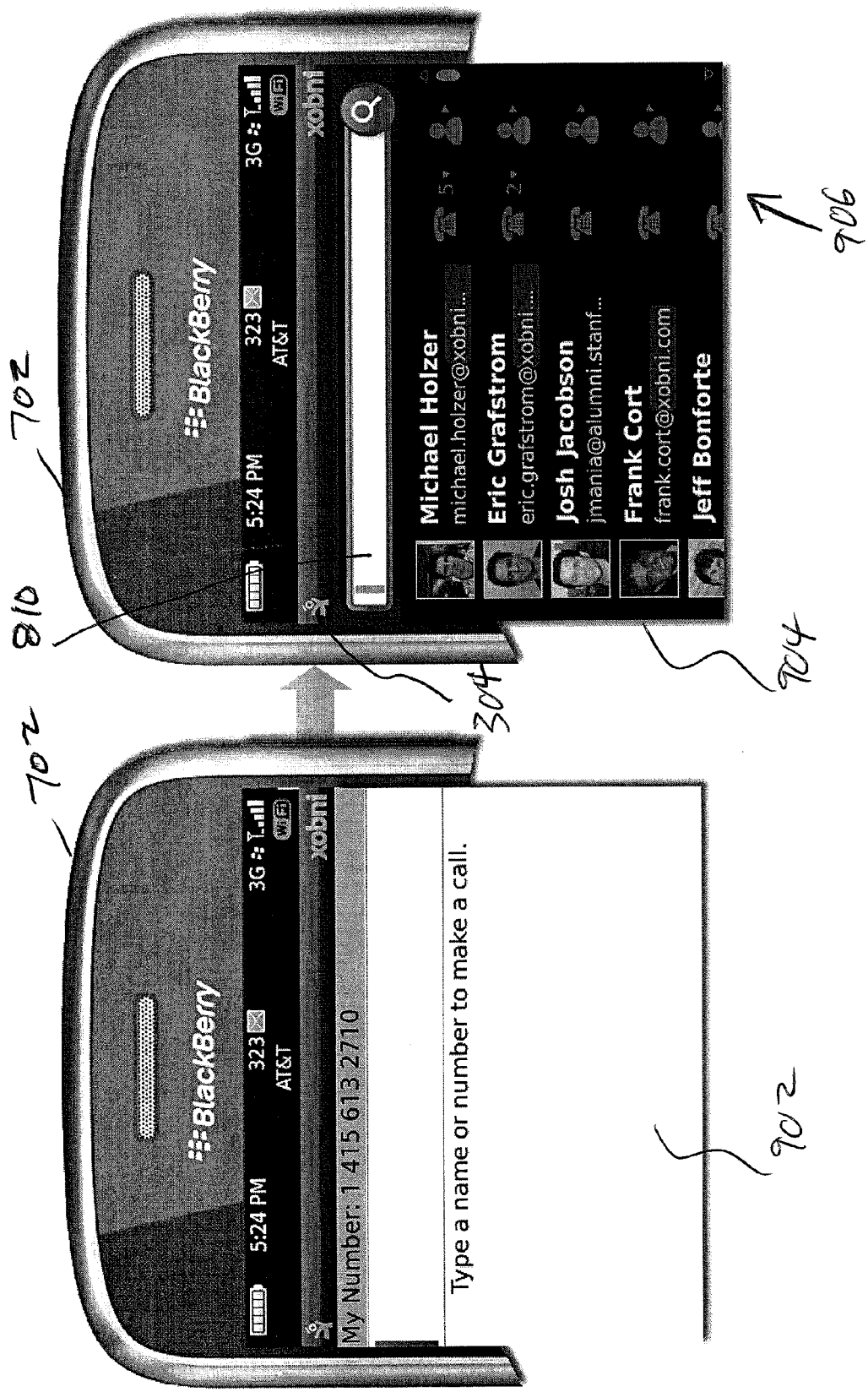
FIG. 9 shows the presentation of a new screen having a list of persons and related information for each person, the new screen being presented in response to detection of a user motion when in a new call initiation creation screen according to one embodiment.

FIG. 9 shows the presentation of a new screen 904 having a list of persons and related information (e.g., email address, with associated phone number and other personal data accessible via displayed icons 906) for each person, the new screen being presented in response to detection of a user motion when in a new call initiation creation or dialer screen 902 according to one embodiment. If the user flicks upwards on the trackball, then the new screen or window 904 will drop down from status indicator bar 304. The user may then select a person or contact to call. The telephone number of the selected person will then be used as input data for making a new call either automatically or after the user presses a "call" button when viewing original call screen 902.

Figure 10:
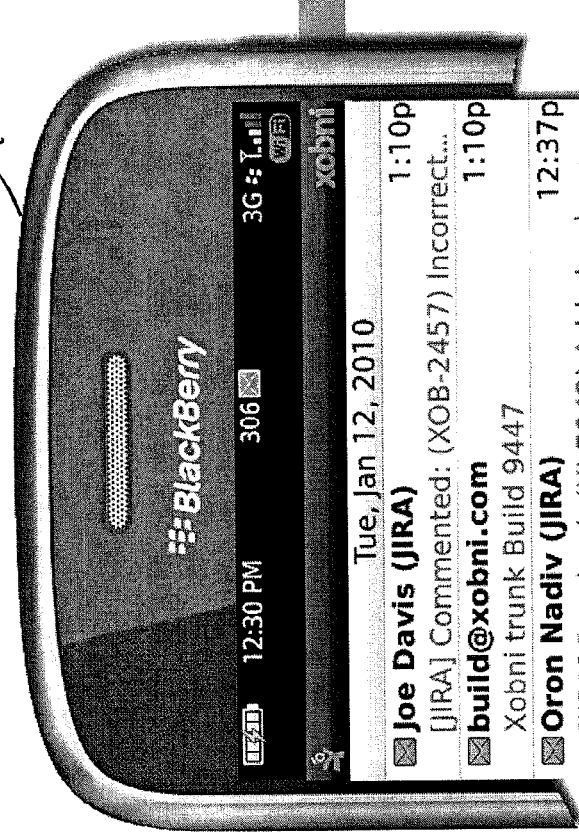
FIG. 10 shows the presentation of a user profile screen containing information regarding a single person, the user profile screen being presented in response to detection of a predefined user motion by a user when viewing an email message list screen according to one embodiment.
Figure 10:

FIG. 10 shows the presentation of a user profile screen or window 1004 containing information regarding a single selected person (e.g., a person profile), the user profile screen being presented in response to detection of a predefined user motion by a user when viewing an email message list screen 1002 according to one embodiment. When the user has selected person 1006 (e.g., by placing a position indicator such as a cursor or a highlighted field on that person's displayed information), then the user makes an upwards flick motion (or in alternative embodiments, a downwards flick motion may be used).

The user device detects the trackball motion, and in response presents second screen 1004. The user profile information is for the selected person 1006 and is obtained from stored personal information on end-user device 702. In alternative embodiments, the flick or other user motion may be performed on a touch screen interface. The user may initiate an activity (e.g., a meeting or phone call) involving the selected person 1006 by clicking on or otherwise activating or selecting an icon displayed in second screen 1004.

Making Relationships Universally Available Across Applications

In one embodiment, the detection of a predefined user motion as described above (e.g., a flick motion) can be implemented on a user device (for any of numerous types of user devices or platforms) so as to provide a universal, contextual access to relevant relationships based on modality (state awareness). In alternative embodiments, the providing of universal, contextual access to relevant relationships is not necessarily based on user motion, but may be based on other operational or state characteristics of a user device. These characteristics may also include data obtained from sensors or systems associated with or operating on the user device.

For example, while on a call (e.g., using a mobile or desktop/Cisco IP phone), a user request for personal information (e.g., user profile or relationships data) presents additional data regarding the caller and the company. The user device also may show additional information about likely-related contacts (e.g., in this case, people that the user most likely would desire to add for a planned conference call). The state awareness simplifies the user interface by reducing the keystrokes/gestures (e.g., pressing of an arrow or other input key, or movement of a finger on a touch screen) required to perform the most typical or common follow-on tasks. The user's actual use and behavior with the user device is more efficient due to the easier access to relevant data (e.g., recent contacts, upcoming appointments, alternate contact data, etc.).

For example, reading email, and checking the people in the thread and their relationship to the user are more efficiently performed (this efficiency in usage also applies to related items, like conversations and attachments exchanged). In a customer relationship management (CRM) or similar application, the state aware interface reduces the address book data for selecting a contact or adding a contact to a small subset of the total available data based on other information in the application. So, as a user is working on its, for example, "Cisco account", the subset of people that are offered/favored to the user via the device interface are a ranked list of Cisco contacts, optionally including a relevance filter on the actual topic relevant to the current user task. This is useful when, for example, the user has information stored in the user device for tens or hundreds of contacts within a given topic or other subject area (e.g., by company, geographic location, etc.).

The presence on the user device of an overlay of contextually-related relationships that is available to the user at any point in navigating or using the user device is helpful to the user. For example, if the user is on the phone in a live conversation, and simply uses a flick motion on a home screen, the user device may show the user a ranked list of people that the user is likely to be dealing or interacting with based on various forms of data collected or accessible by the device (e.g., geographic data, calendar data, time of day, items and data in the user's inbox, etc.). The list of most likely information desired or needed by the user is a significantly smaller subset (e.g., in the tens of persons) when compared to the total available relationships stored on the user device (e.g., which may be in the thousands of persons).

For example, an overlay of relationships across applications may be now described with respect to a BlackBerry user device. When the user is composing an email, a flick motion upwards provides the user with relatively quick access to those persons the user might need to send an email. The user interface is made smarter by any input the user may have provided (e.g., subject, body, other recipient, or prior activity like a recent phone call). This analysis is independent of the core application. The person relationships are carried universally across the user device platform and offered for use by any of the applications that may be running on the platform.

This may be implemented similarly to the manner in which printing services are offered to all applications on a personal computer. In some embodiments, the application itself may modify or customize the implementation of the printing option. For example, a label printing application may provide formatting for label printing (even though the printing is handled universally by the operating system (OS) or a service that runs in addition to the application itself).

The application itself may allow for the service to be invoked. In this example, the user indicates it has an account with a third party service provider (e.g., the Xobni service), and then the service provider's computer systems interact with the application to supplement the application. For example, the application does not need to be integrated at the OS or device level.

Data Processing System, Processes, and Closing

Figure 11:
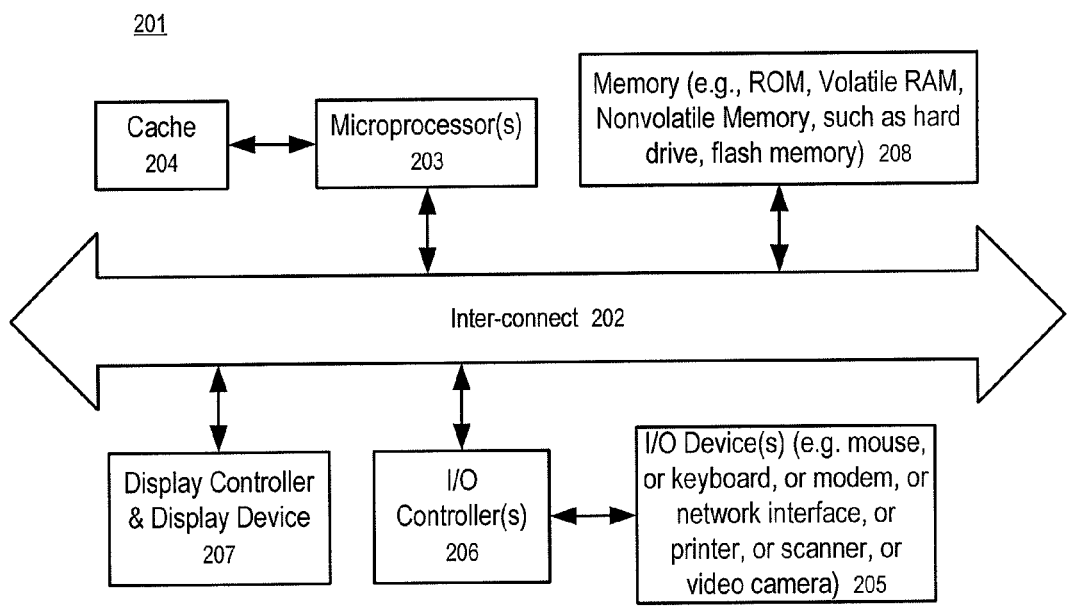
FIG. 11 shows a block diagram of a data processing system which can be used in various embodiments.

FIG. 11 shows a block diagram of a data processing system 201 which can be used in various embodiments. While FIG. 11 illustrates various components of a computer system, it is not intended to represent any particular architecture or manner of interconnecting the components. Other systems that have fewer or more components may also be used.

In FIG. 11, the system 201 includes an inter-connect 202 (e.g., bus and system core logic), which interconnects a microprocessor(s) 203 and memory 208. The microprocessor 203 is coupled to cache memory 204 in the example of FIG. 11.

The inter-connect 202 interconnects the microprocessor(s) 203 and the memory 208 together and also interconnects them to a display controller and display device 207 and to peripheral devices such as input/output (I/O) devices 205 through an input/output controller(s) 206. Typical I/O devices include mice, keyboards, modems, network interfaces, printers, scanners, video cameras and other devices which are well known in the art.

The inter-connect 202 may include one or more buses connected to one another through various bridges, controllers and/or adapters. In one embodiment the I/O controller 206 includes a USB (Universal Serial Bus) adapter for controlling USB peripherals, and/or an IEEE-1394 bus adapter for controlling IEEE-1394 peripherals.

The memory 208 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a data processing system as illustrated in FIG. 11 is used to implement an online social network site 123, and/or other servers, such as server 150.

In one embodiment, a data processing system as illustrated in FIG. 11 is used to implement a user device. A user device may be in the form of a personal digital assistant (PDA), a cellular phone, a notebook computer or a personal desktop computer.

In some embodiments, one or more servers of the system can be replaced with the service of a peer to peer network of a plurality of data processing systems, or a network of distributed computing systems. The peer to peer network, or a distributed computing system, can be collectively viewed as a server data processing system.

Embodiments of the disclosure can be implemented via the microprocessor(s) 203 and/or the memory 208. For example, the functionalities described can be partially implemented via hardware logic in the microprocessor(s) 203 and partially using the instructions stored in the memory 208. Some embodiments are implemented using the microprocessor(s) 203 without additional instructions stored in the memory 208. Some embodiments are implemented using the instructions stored in the memory 208 for execution by one or more general purpose microprocessor(s) 203. Thus, the disclosure is not limited to a specific configuration of hardware and/or software.

Figure 12:
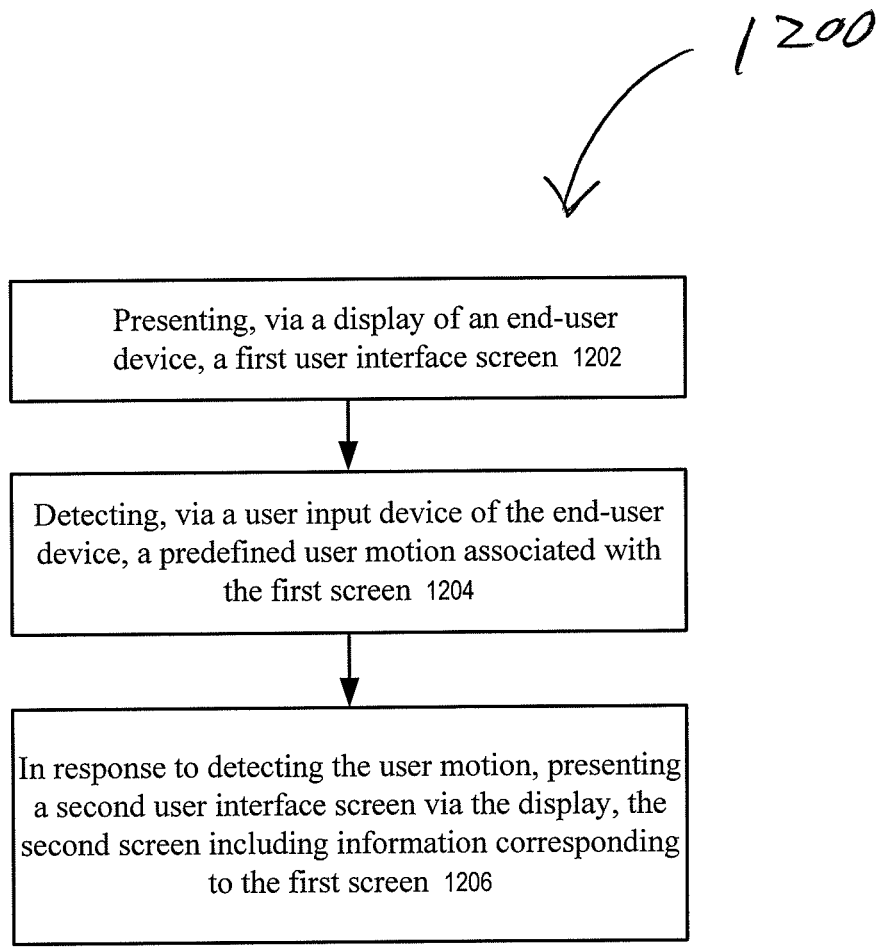
FIG. 12 shows a method to present a second user interface screen in response to detecting a user interface motion on a first user interface screen according to one embodiment.

FIG. 12 illustrates a process 1200 to present a second user interface screen in response to detecting a user interface motion on a first user interface screen according to one embodiment. In block 1202, a first user interface screen is presented to a user on a display of an end-user device. In block 1204, a predefined user motion associated with the first screen is detected using a user input device of the end-user device. In block 1206, in response to detecting the user motion, a second user interface screen is presented to the user on the display. The second screen includes information corresponding to the first screen.

In a first embodiment, process 1200 comprises presenting, via a display of the end-user device, a first user interface screen; detecting, via a user input device of the end-user device, a predefined user motion associated with the first screen, wherein the user motion is substantially in a single direction of movement in a plane parallel to the display; and in response to detecting the user motion, presenting a second user interface screen via the display, the second screen including information corresponding to the first screen.

In one embodiment, the single direction of movement is one of upwards, downwards, diagonally, leftwards, and rightwards. In one embodiment, the user input device is a trackball and the predefined user motion is an upward movement by a user on the trackball. In one embodiment, the detecting the user motion comprises determining at least one of a velocity and an acceleration of the upward movement of the trackball to be exceeding a predetermined limit.

In another embodiment, the user input device is a touch screen and the predefined user motion is an upward movement by a user on the touch screen.

In one embodiment, the first screen includes an input field to identify a person, and the second screen includes a list of a plurality of persons. In one embodiment, the second screen further includes a search input field to permit searching of stored information in a database, the stored information corresponding to personal data available for user selection as an input for the first screen, and the process 1200 further comprising updating the list of persons of the second screen in response to a result obtained from searching the stored information.

In one embodiment, the input field of the first screen is an email address field for a new email being composed on the end-user device, and the list of persons of the second screen provides user access to a respective email address for each of the plurality of persons. In one embodiment, the first screen includes a list of data items for a plurality of persons, each respective data item corresponding to a unique one of the plurality of persons; the predefined user motion is associated with a first person of the plurality of persons; and the second screen presents a personal profile for the first person, the profile comprising an email address and a phone number.

In one embodiment, the user motion corresponds to movement of a position indicator on the display; and the detecting the user motion comprises determining that the predefined user motion occurs when the position indicator is at a predefined location of the first screen. In one embodiment, the position indicator is one of a cursor and a highlighted field. For example, the predefined location may be one of an input field, an area, and a position.

In one embodiment, the process 1200 further comprises presenting an indicator in the first user interface screen to indicate to a user that the end-user device has a present ability to detect the predefined user motion, and wherein the predefined location is an area located beneath the indicator. In one embodiment, the indicator is at least one of the following: a horizontal bar extending across at least a portion of the first user interface screen, and an icon.

In one embodiment, the process 1200 further comprises receiving a user selection input on the second user interface screen; and providing a data input for the first user interface screen, the data input corresponding to the user selection input. In one embodiment, the first screen is a phone dialing interface, the user selection input corresponds to a person to be called, and the data input for the first screen is a phone number for the person to be called.

In another embodiment, the first screen is a new appointment interface, the user selection input corresponds to a person to be invited to an appointment, and the data input for the first screen is an addition of the person to be invited as an invitee of the appointment.

In a second embodiment, process 1200 comprises presenting, via a display of the end-user device, a first user interface screen including an input field to identify a person; detecting, via a user input device of the end-user device, a predefined user motion associated with the first screen; in response to detecting the user motion, presenting a second user interface screen via the display, the second screen including a list of persons and further including a search input field configured to initiate a search of stored personal data available for use as a data input for the first screen; and updating the list of persons of the second screen in response to the searching of the stored personal data.

In one embodiment, the detecting the user motion comprises determining that the user motion is associated with a predefined portion of the first user interface screen.

In a third embodiment, process 1200 comprises presenting, via a display of a mobile device, a first user interface screen including an input field to identify a person; detecting, via a trackball of the mobile device, a predefined user motion associated with the first screen, wherein the user motion is an upward movement on the trackball by a user of the mobile device; in response to detecting the user motion, presenting a second user interface screen via the display, the second screen including a list of persons and corresponding personal data, the personal data being available as input data for the first screen upon selection of a person by the user; receiving a selection by the user of a first person from the list of persons of the second screen; and displaying personal data corresponding to the first person on the first screen.

In one embodiment, the detecting the user motion comprises determining at least one of a velocity and an acceleration of the upward movement of the trackball to be exceeding a predetermined limit.

In yet other embodiments, a first computer program implementing process 1200 is a separate program from an e-mail or other program used on, for example, a BlackBerry device. This may necessary, for example, if the e-mail or other program does not provide access to an application program interface (API). The first computer program is able to work together with the e-mail program as if they were one program from the user's perspective.

The user does not have to explicitly switch back and forth between the distinct programs or applications to complete a data input item. The flick motion is one form of input that triggers the cooperation. In response to a flick motion, the first computer program takes the partial input from the email program, provides auto-complete assistance (e.g., automatically obtaining relevant data from personal information stored on the user device), and returns the completed input to the email program.

In other embodiments, the context of the user's behavior and tasks may be used as the basis for the presentation of information to the user when performing a particular task. In other words, the user's actions, physical environment, and intended task goals (e.g., type of task, geographic location, buttons pressed and the manner in which motions are implemented, data previously entered into a draft email or other data entered immediately prior to entering an email composition screen) may be used as a basis for providing contextual access to data stored on the user device and/or accessible from server 105 or otherwise over communication network 121.

In one embodiment, the monitored inputs that trigger a presentation of information to a user may include input means such as arrow keys or other cursor-moving or position indicating devices.

In another embodiment, the user is able to be presented and select relevant input data without having to use a conventional selection mechanism (e.g., a click) on the first user interface screen, which would cause the display screen or keyboard focus to change.

In one embodiment, process 1200 permits a user to access personal information stored on the user device without having to first navigate away from and leave the first screen on which an action is being performed (e.g., email composition). In other words, the user does not need to invoke a different application from a menu, which takes the user away from the current application and task. The presented second screen may be a drop down screen that overlays a portion of or all of the first screen from which the user motion is detected. The second screen may include links that the user can click on or activate that cause the user device to present yet further screens containing personal information that is contextually relevant to the path of screens or actions the user has taken in navigating the user interface.

In other embodiments, process 1200 could be implemented with various other mobile operating systems (e.g., Android, iPhone, Symbian, Linux Mobile, etc.) that have a means of receiving or detecting a user motion provided via input devices (e.g., using a trackball or touch screen that allows the user to initiate an action based on location on a screen at the time of the motion and/or the velocity of the motion).

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
collecting historical communication data;
storing an address book comprising a plurality of persons, each person having an importance ranking based on the historical communication data;
detecting, via a user device, a predefined user motion of a user when the user is creating a new message or invitation;
determining a current state of the user device based on at least one characteristic;
in response to detecting the user motion, presenting, via a display of the user device, a list of persons selected from the address book, the list presented to the user in an order based on the respective importance ranking of each person in the list and further based on the current state, wherein the user is able to select a first person from the list for adding to an input field of the new message or invitation;
receiving a selection from the user of the first person; and
displaying, via the display, the new message or invitation with the first person added to the input field.

2. The method of claim 1, wherein the at least one characteristic is data obtained from a sensor of the user device.

3. The method of claim 1, wherein the at least one characteristic is a prior phone call of the user via the user device.

4. The method of claim 1, wherein the user motion is associated with use of a first application running on the user device, and the at least one characteristic is data obtained from a second application running on the user device.

5. The method of claim 1, wherein the predefined user motion is a keystroke or a gesture.

6. The method of claim 1, wherein the address book is stored on the user device.

7. The method of claim 1, wherein the at least one characteristic comprises prior keystrokes or gestures of the user on the user device.

8. The method of claim 7, wherein the at least one characteristic further comprises data obtained by the user device from one or more messages in an inbox of the user device.

9. The method of claim 1, wherein the at least one characteristic comprises a type of user interface screen or window currently open on the user device, and further comprises a history of prior user interface actions on the user device by the user.

10. The method of claim 1, wherein a user interface of the user device comprises at least one input field, and the at least one characteristic comprises prior data input by the user into the at least one input field.

11. The method of claim 1, wherein the at least one characteristic comprises at least a portion of the historical communication data.

12. The method of claim 1, wherein each at least one characteristic is selected from the group consisting of geographic data determined by the user device, calendar data stored on the user device, and a time of day determined by the user device.

13. A non-transitory computer-readable storage medium tangibly storing thereon computer-readable instructions, the instructions causing a system to:
collect historical communication data;
store an address book comprising a plurality of persons, each person having an importance ranking based on the historical communication data;
run an application, on a user device, requested by a user via a user interface of the user device;
receive a request for information from the user associated with use of the application by the user;
determine a current state of the user device based on at least one characteristic of the user device;
in response to the request, present, via a display of the user device, a list of persons selected from the address book, the list presented to the user in an order based on the respective importance ranking of each person in the list and further based on the current state, wherein the user is able to select a first person from the list for adding to an input field of a user screen or window;
receive a selection from the user of the first person; and
display, via the display, the user screen or window with the first person added to the input field.

14. The storage medium of claim 13, wherein the instructions further cause the system to store the address book in a memory of the user device.

15. The storage medium of claim 13, wherein the at least one characteristic is a prior phone call of the user via the user device.

16. The storage medium of claim 13, wherein each at least one characteristic is selected from the group consisting of geographic data determined by the user device, calendar data stored on the user device, and a time of day determined by the user device.

17. A user device, comprising:
a display to provide a user interface to a user;
a user input device for the user to interact with the user interface;
at least one processor; and
at least one memory storing instructions configured to instruct the at least one processor to:
collect historical communication data;
store an address book comprising a plurality of persons, each person having an importance ranking based on the historical communication data;
detect a predefined user motion on the user input device when the user is creating a new message or invitation;
determine a current state of the user device based on at least one characteristic of the user device;
in response to detecting the user motion, present, via the display, a list of persons selected from the address book, the list presented to the user in an order based on the respective importance ranking of each person in the list and further based on the current state, wherein the user is able to select a first person from the list for adding to an input field of the new message or invitation;
receive a selection from the user of the first person; and
display, via the display, the new message or invitation with the first person added to the input field.

18. The user device of claim 17, further comprising a sensor, and wherein the at least one characteristic includes data obtained from the sensor.

19. The user device of claim 17, wherein the at least one memory further stores a history of prior user interface actions on the user device by the user, and wherein the at least one characteristic comprises a type of user interface screen or window currently open on the display, and further comprises data obtained from the history.

* * * * *